F. J. WALKER, Jr.
METHOD OF STORING UNFERMENTED FRUIT JUICE.
APPLICATION FILED JAN. 11, 1913.
1,103,920.
Patented July 14, 1914.
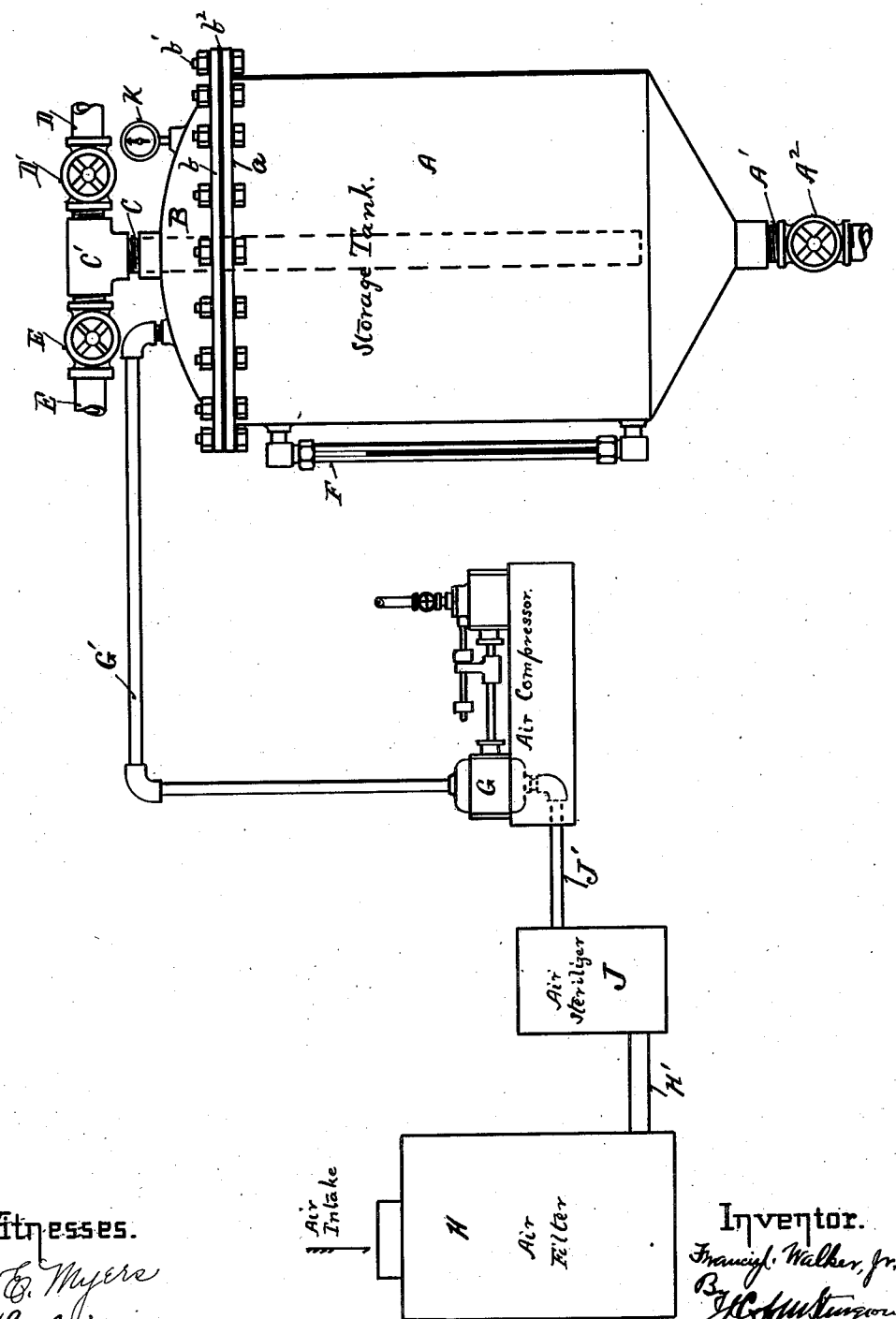

UNITED STATES PATENT OFFICE.

FRANCIS J. WALKER, JR., OF ERIE, PENNSYLVANIA.

METHOD OF STORING UNFERMENTED FRUIT-JUICE.

1,103,920.  Specification of Letters Patent.  Patented July 14, 1914.

Application filed January 11, 1913. Serial No. 741,500.

*To all whom it may concern:*

Be it known that I, FRANCIS J. WALKER, Jr., a citizen of the United States, residing at Erie, in the county of Erie and State of Pennsylvania, have invented certain new and useful Improvements in Methods of Storing Unfermented Fruit-Juices; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to the storage and handling of unfermented fruit-juice.

Heretofore, in the manufacture and preparation of unfermented fruit-juice, like unfermented grape-juice, for example, after the same has been pressed out of the pulp, it has been customary to sterilize the juice by means of heating the same to about one-hundred and ninety degrees, and then sealing it up in a hot condition, in comparatively small containers, like jugs or carboys, of about five gallon capacity each, so that when the juice cools in these containers there will be a vacuum therein, the hermetic seals of these containers preventing the entry thereinto of germ-bearing air, which would start fermentation in the juice contained therein. The juice is then allowed to stand in these containers about three months, to permit the sediment therein to settle to the bottom of the containers. It has been found that this vacuum system of storing fruit-juice, above described, is impracticable when attempted with containers of large capacity, owing to the difficulty in maintaining the vacuum therein, and because when it is desired to draw out therefrom, a portion of the contents, the seal has to be broken, thereby permitting unsterilized air to enter into the container, thereby contaminating that portion of the contents left in the container.

The object of this invention is therefore, to provide an improved method, whereby unfermented fruit-juice may be stored in large tanks, without danger of fermentation because of unsterilized air entering therein, and whereby any quantity of the contents of such container can be withdrawn from without permitting the entry thereinto of germ-bearing, or unsterilized air. I accomplish this result by filling the heated juice into a closed tank, and then forcing compressed sterilized air or gas into the tank, above the juice therein, at a suitable pressure, and constantly maintaining substantially such pressure of sterilized air or gas in the tank during the period that it is necessary to keep the juice in said tank.

The features of my invention are hereinafter fully described and set forth, and are illustrated in the accompanying drawings, in which the figure is a view in elevation showing suitable apparatus for carrying out and practising my invention.

In this drawing, A, indicates a storage tank of any desired capacity, having a discharge pipe A', leading from the bottom thereof, and a shut-off valve A² therein. The upper end of the tank A, is provided with a flange $a$, around its upper edge. Upon the flange $a$, is placed a cover B, provided with a flange $b$, around its periphery, which flanges are bolted together by means of the bolts $b'$, with a gasket $b^2$, of suitable material, therebetween. Secured in the cover B, and extending downward therefrom into the tank A, is a pipe C, and upon the end of this pipe C, I place a T-connection C', and into one arm of this connection C', I secure a supply pipe D, provided with a shut off valve D'; in the other end of the connection C', I secure a fluid discharge pipe E, provided with a shut-off valve E'. The tank A, is also preferably provided with a sight-gage F, of usual and ordinary construction, whereby the quantity of liquid in the tank A, may be ascertained. For supplying air under pressure to the tank A, I provide an air compressor G, or other suitable means of supplying air under pressure, and connect the same to the upper end of the tank A, by means of a pipe G'. In order that the air supplied to the tank A, shall be clean and free from germs, I provide an air filter H, of usual and ordinary construction, and a sterilizer J, of usual and ordinary construction, through which filter the compressor G, will draw its supply of air by means of the tubes or pipes H', and J'. I also preferably provide the tank A, with a pressure gage K, of usual and ordinary construction, whereby the pressure within the tank A, may be observed. It is well known that the hot sterilized juice, when placed within the tank, contains no germs which will cause fermentation, and I have discovered that the maintaining of a pressure of sterilized air within the tank, slightly above atmospheric pressure, if constantly maintained, will prevent the entry into the tank, of germ-bearing air and thereby prevent the fermentation of the fluid therein.

A further feature of this invention is, that when it is desired to remove fluid from the tank, for the purpose of bottling or other purposes, the pressure of sterilized air within the tank A, can be so increased when desired, as to force the fluid out through the pipe C, connection C', and discharge pipe E, to such point as may be desired, thereby eliminating all exposure of the fluid to the air during the handling thereof.

I have herein shown and described a suitable apparatus and means for carrying out my invention, but it is obvious that many modifications and changes of construction can be made therein, and suitable gases could be used, instead of sterilized air, thereby producing a mechanism and means whereby my invention can be practised. Therefore I do not desire to confine myself to any particular construction of mechanism for carrying out and practising the invention herein described.

Therefore what I claim as new and desire to secure by Letters-Patent, is:—

1. The method of storing unfermented fruit juice, consisting in placing sterilized juice in an inclosed tank, and connecting said tank with a source of sterile air, under uniform pressure adapted to supply leakage of air therefrom, substantially as set forth.

2. The method of storing unfermented fruit juice, consisting in placing sterilized juice in an inclosed tank and connecting said tank with suitable apparatus adapted to supply sterile air to said tank under uniform pressure adapted to supply leakage therefrom, substantially as set forth.

In testimony whereof I affix my signature, in presence of two witnesses.

FRANCIS J. WALKER, Jr.

Witnesses:
H. M. STURGEON,
JOHN B. BROOKS.